United States Patent Office 3,313,749
Patented Apr. 11, 1967

3,313,749
METHOD OF PRODUCING A MODIFIED PROTEIN-ETHYLENICALLY UNSATURATED MONOMER GRAFT CO-POLYMER
Harold R. Ready, Decatur, Ill., assignor to A. E. Staley Manufacturing Company, Decatur, Ill., a corporation of Delaware
No Drawing. Filed Dec. 15, 1960, Ser. No. 75,922
7 Claims. (Cl. 260—8)

This invention relates to graft copolymers of ethylenically unsaturated monomers and proteins and new methods of carrying out the polymerization reactions.

Previously, ethylenically unsaturated monomers have been polymerized in the presence of proteins. In the majority of these polymerization reactions, the protein apparently takes no active part in the reaction. By this I mean that the protein itself is not chemically modified by the ethylenically unsaturated monomers. In other words, the reaction product contains a physical mixture of protein and the polymer of the ethylenically unsaturated monomer. In those reactions in the prior art where the protein itself is modified by mono-ethylenically unsaturated monomers, the only products are films that are very water-sensitive or water-soluble. The water sensitivity of these polymers is due to the water sensitivity of the protein backbone, the degree of substitution on the protein backbone, and to the water sensitivity of the ethylenically unsaturated monomer. Where the degree of substitution is low or even where the degree of substitution may be high, but the monomer is a hydrophilic monomer such as acrylic acid, acrylamide, or vinyl-pyridine, the resultant polymer is quite water-sensitive and even water-soluble. See U.S. Patent No. 2,763,625 to Illingsworth et al. in this regard. Such products leave much to be desired when used to form films or coatings, and their use is therefore limited to films that are to be dissolved in water. Accordingly, an object of this invention is to prepare new graft copolymers of hydrophobic ethylenically unsaturated monomers and proteins where the graft copolymers can be cast into water-insoluble films or molded into water-insoluble products which are considerably less water-sensitive than the products of the prior art. This permits, for the first time, the use of these graft copolymers as permanent coatings and as thermoplastic molding powders. Further, these products are insoluble in all common organic solvents, such as benzene, acetone and alcohol. This property enhances the utility of the films and molded articles of this invention.

A further object of this invention is to prepare graft copolymers of ethylenically unsaturated monomers and proteins by new and novel techniques.

In one aspect this invention is a process of preparing water-insoluble, organic solvent-insoluble graft copolymers of an ethylenically unsaturated monomer and a protein free of unreacted monomers and homopolymers, which comprises graft polymerizing an ethylenically unsaturated monomer with a protein in the presence of a polymerization catalyst and isolating said water-insoluble, organic solvent-insoluble graft copolymer from unreacted monomers and homopolymers by dissolving said monomers and homopolymers in a solvent for said monomers and homopolymers.

In a second aspect this invention is the process of graft polymerizing a halogenated protein and an ethylenically unsaturated monomer, wherein a reducing agent is the sole catalyst.

In a third aspect this invention is the process of graft polymerizing a brominated protein or a chlorinated protein and an ethylenically unsaturated monomer in the absence of a catalyst.

In a fourth aspect this invention is the process of graft polymerizing a diazo treated protein and an ethylenically unsaturated monomer, wherein a reducing agent is the sole catalyst.

In a fifth aspect this invention is the process of graft polymerizing an oxidized protein and an ethylenically unsaturated monomer, wherein a reducing agent is the sole catalyst.

In a sixth aspect this invention is the process of graft polymerizing a protein and an ethylenically unsaturated monomer, wherein the catalyst is an organic azo compound containing an acyclic azo group.

In another aspect this invention is the process of graft polymerizing a protein and an ethylenically unsaturated monomer, wherein the catalyst is a redox system comprising an oxidizing agent and a reducing agent selected from the group consisting of sulfur dioxide, hydrosulfites, bisulfites, sulfites and sulfurous acid.

In still another aspect this invention is a water-insoluble, organic solvent-insoluble graft copolymer of a hydrophobic ethylenically unsaturated monomer and a protein.

The above water-insoluble organic solvent-insoluble graft copolymers of proteins with hydrophobic ethylenically unsaturated monomers have a grafting level of at least 45. A grafting level of 45 means that for every 100 grams of protein backbone, there is 45 grams of ethylenically unsaturated monomer polymerized and chemically combined with the protein backbone. While a grafting level of 45 results in a polymer which is considerably more water-resistant than those previously used to make films, a grafting level of at least 100 is preferred to impart waterproof qualities. Further, although a grafting level of at least about 90 is required in order to prepare a thermoplastic molding powder, a grafting level of at least 140 is preferred for using these new graft copolymers as thermoplastic molding powders. At this point it is important to note that polymerizing a mixture of 45 grams of monomer with 100 grams of protein will rarely, if ever, result in a grafting level of 45. This is due to the fact that only part of the monomer will be grafted on to the protein backbone while part will be homopolymerized and part will not be polymerized at all. Accordingly, the term "yield" as used in this application refers to percent of ethylenically unsaturated monomer actually polymerized, while "grafting efficiency" is the grams of ethylenically unsaturated monomer grafted (i.e., chemically combined with protein) divided by the grams of ethylenically unsaturated monomer polymerized.

The polymerizable monoethylenically unsaturated hydrophobic monomers, which can be employed in this invention, include, for example, styrene or substituted styrenes, such as alpha-methyl styrene, o-methyl styrene, p-hexyl styrene, 2,4-dimethyl styrene, p-fluorostyrene, 2,5-dichlorostyrene and p-nitrostyrene; alkyl acrylates such as methyl acrylate, n-decyl methacrylate and beta-chloroethyl acrylate; vinyl ethers such as vinyl methyl ether and vinyl butyl ether; vinyl esters such as vinyl acetate and vinyl stearate; vinyl ketones such as vinyl methyl ketone and vinyl ethyl ketone; and monoethylenically unsaturated halides such as vinylidene chloride and vinyl chloride. As the protein in this invention, we can use animal proteins, such as gelatin and glue or vegetable proteins, such as soybean, pea, bean, corn, cottonseed and potato. However, we prefer vegetable protein and more particularly soybean protein. Soybean protein has approximately 6% by weight tyrosine and histidine, whose rings are necessary for the efficacious use of proteins which have been treated with from 0.5%–20% by weight halogen or with from 0.5%–20% by weight diazo compounds. The protein used in the invention may be partially hydrolyzed, partially oxidized, treated with halogen (e.g., chlorine, bromine and iodine) or with diazo compounds. Of course, mixtures of various monomers and proteins can be used where special properties are required.

Although bulk polymerization can be used, I prefer to carry out the graft polymerization in solution without surfactants or chain transfer agents. Nevertheless, surfactants, such as alkali metal salts of higher fatty acids, higher fatty alcohol sulfates, salts of aromatic sulfonic acids, and alkylated phenoxy polyoxyethylene ethers can be used. Typical of these are sodium stearate, potassium palmitate, potassium di (2-ethylhexyl) sulfosuccinates, sodium salts of alkyl-substituted naphthalene sulfonic acid and nonylphenoxypolyethylene glycol ether. For the most part, it is immaterial whether the ethylenically unsaturated monomer is polymerized with or without the polymerization inhibitors normally added to the commercial product.

In somewhat greater detail the processes of this invention comprise reacting an ethylenically unsaturated monomer with an aqueous solution of a modified or unmodified protein, wherein the protein comprises preferably from 5 to 40% by weight of the aqueous solution, at a temperature of from 20° C. to 100° C. and then isolating the water-insoluble protein graft copolymer. The water-insoluble graft copolymer, which is partitioned (separated) from the reaction mixture by either filtering or centrifuging, is then freed from water-insoluble homopolymer and/or ethylenically unsaturated monomer by dissolving the homopolymer and/or ethylenically unsaturated monomer in an organic solvent for same. The graft copolymer is then isolated from the solvent medium by either filtration or centrifuging.

The organic solvents, which can be used to extract the water-insoluble monomers and homopolymers from the graft copolymers include hydrocarbons, such as benzene, cumene, pentane, hexane, and other hydrocarbon fractions, etc.; ketones, such as acetone; alcohols, such as methanol, ethanol, butanol, etc.; ethers, such as dioxane; halogenated hydrocarbons, such as carbon tetrachloride, trichloroethylene, etc.; sulfoxides, such as dimethyl sulfoxide; amides, such as dimethyl formamide, etc.

When reacting unmodified proteins, hydrolyzed proteins or oxidized proteins, the common free radical catalysts usually used to polymerize ethylenically unsaturated monomers can be used. These free radical catalysts, which can be present in the range of from .1% to 10% by weight of the ethylenically unsaturated monomer, include various peroxides and azo compounds. The peroxide catalysts, which can be used in this invention, include potassium persulfate, ammonium persulfate, di-t-butyl peroxide, hydrogen peroxide, benzoyl peroxide, acetyl peroxide, tertiary butyl hydroperoxide and potassium perborate. Of these, potassium persulfate, ammonium persulfate, di-t-butyl peroxide and hydrogen peroxide have proved to be particularly useful. Any of the aforementioned peroxidic catalysts can be used with reducing agents in a redox system. While various reducing agents, such as hydroxylamine, sulfoxylates and ferrous sulfate, work well with specific monomers and specific peroxidic catalysts (see Schildknecht, Vinyl and Related Polymers, pages 92–110, 265–268); sodium hydrosulfite, sulfurous acid, sodium sulfite, potassium bisulfite and sulfur dioxide have proven to be particularly efficacious. To the best of my knowledge, I am not aware that protein has been graft polymerized with an ethylenically unsaturated monomer using any of the redox catalysts of this invention. The reducing agent is usually present in concentrations of from .05% % to 5% by weight of the ethylenically unsaturated monomers. Its concentration is usually half that of the peroxidic catalyst, and the total amount of catalyst can then range from .15% to 15% by weight of monomer. In addition, any of the aliphatic azo compounds of U.S. Patent 2,471,959 can be used as the catalyst, but the commercially available azo-diisobutyronitrile gives excellent results. These azo compounds may be characterized as compounds containing an acyclic azo group having bonded to each nitrogen a discrete carbon atom of the class consisting of aliphatic and cycloaliphatic carbon atoms, at least one of said carbon atoms being tertiary.

While the use of peroxidic catalysts in the graft polymerization of ethylenically unsaturated monomers is known, it was surprising to find that if the protein was treated first with halogen or with a diazo compound or if the protein was oxidized, a reducing agent of the types already described (those used in redox catalysts of the free-radical type) can be used as the sole polymerization catalyst. Apparently, each of the above treatments prepares a site for the ethylenically unsaturated monomer to graft onto and this obviates the necessity of a peroxidic catalyst, which performs a similar function.

It is believed that the halogen reacts with the phenolic group of tyrosine and/or the imidazole nucleus of histidine by replacement of ring hydrogens. These two amino acids comprise approximately 6% by weight of soybean protein. Subsequently, when the reducing agent and monomer are introduced into the polymerization vessel, the reducing agent gives up an electron liberating a halide ion from the phenolic ring of tyrosine or the imidazole ring of histidine. These rings are left with a free electron and become free radical sites for grafting the chains of ethylenically unsaturated polymer.

When bromine is reacted with the proteins of this invention, a reducing agent may be omitted since the bromine forms an $OBr^-$ group in the presence of oxygen which is dissolved in the protein solution. The $OBr^-$ group is a reducing agent which initiates the formation of free radical sites at which the ethylenically unsaturated monomer grafts. Likewise when chlorine is reacted with the proteins of this invention, a reducing agent may be omitted since the chlorine forms an $OCl^-$ group.

The basis of the reaction of the diazo treated protein is considered to be essentially the same as that of the halogen-treated protein. The diazo compound couples with the ring-containing tyrosine and/or histidine portion of the protein. When treated with a reducing agent, the activated tyrosine and/or histidine form free radical sites at which the ethylenically-unsaturated polymer chains may become attached.

The mechanism by which oxidized protein polymerizes with ethylenically unsaturated monomers is not understood. However, the oxidation of protein decreases the primary amine content of the protein by from 20% to 80%. These amine groups are convtrted into oxime and/or nitroso groups, which are known to react with ethylenically unsaturated groups in the presence of reducing agents. Although this system may appear superficially similar to the reaction of an unmodified protein with an ethylenically unsaturated monomer in the presence of an oxidizing catalyst and a reducing agent, the differences in reaction among the various monomers belie the appearances. For example, butyl acrylate, which reacts with oxidized protein in good yields, has little tendency to react with unmodified protein in the presence of either a peroxidic catalyst or a redox catalyst. On the other hand styrene and vinyl acetate, which react readily with an unmodified protein in the presence of a peroxidic catalyst or redox catalyst, have little tendency to react with an oxidized protein.

However, whether a modified or unmodified protein is reacted, I have found that temperatures of from 20° C.– 100° C. for from one-half hour to 24 hours are efficacious. Although higher temperatures and longer reaction periods may be used, they are not recommended since the protein may hydrolyze excessively at higher temperatures unless great care is exercised, while longer reaction periods are economically undesirable. At temperatures up to 100° C. the pH of the reaction is not critical. However, the pH must be kept between 5 and 9, and preferably 6 and 8, when higher temperatures are used in order to hold the hydrolysis of the protein to a tolerable level. Inasmuch as the pH of the reaction mixture falls as the reaction progresses, rigid pH control is not easy at the highly elevated temperatures.

The following examples typify the techniques for preparing the polymers of this invention, but the invention is not limited to the details disclosed. In the tables M/P is the weight ratio of monomer to protein, unless otherwise indicated.

Example 1

Twenty grams of soybean alpha protein and 180 ml. of 0.4% by weight NaOH were placed in a 500 ml. flask equipped with stirrer, thermometer and nitrogen inlet tube. The flask was purged of air by replacing it with nitrogen. Five grams of $K_2S_2O_8$ and 2.5 grams of $NaHSO_3$ were added to the flask followed by 50 grams of styrene, which had been washed with NaOH in order to remove the polymerization inhibitor: p-tert.-butyl phenol. The temperature rose to 58° C. from 30° C. In about 30 minutes a white solid separated and after filtering and drying to constant weight, 47 grams of brownish powder was recovered. The yield was 677, and 54% of the styrene had been polymerized. Twenty-six and five-tenths grams of pulverized polymerizate was suspended in 400 ml. of benzene and ball milled for 24 hours at room temperature to extract homopolymerized styrene. The liquid was decanted and 17.8 grams (dry weight) of solid graft copolymer was isolated. The graft copolymer had a grafting level of 56. The product was insoluble in benzene and water.

Example 2

A number of samples were prepared, varying the catalyst, but otherwise following this procedure: Eighty grams of soybean alpha protein was added to 720 ml. of 0.4% by weight of NaOH. The pH was then lowered to 6.5 with 85% $H_3PO_4$. One hundred grams of this solution and 20 grams of styrene were charged into a seven ounce pop bottle, which was then purged of air with nitrogen. After five minutes of purging, the initiator was added and the bottle was capped. The bottle was rotated in a water bath at 50° C. for 18 hours. The polymerizate was washed with water into a 250 ml. centrifuge bottle. The solid was separated by centrifuging and decanting, washed with water and dried at 50° C. and then weighed. This product was then placed in a flask with 200 ml. of benzene and rotated for 18 hours at a temperature of 50° C. in a water bath to extract styrene monomer and homopolymer. The solid was separated from the benzene, dried and weighed.

The following table gives the results with various catalysts where the percent by weight of catalyst is based on the weight of the ethylenically unsaturated monomer.

TABLE I

| Initiator Type | Results | | | Grafting Level | Grafting Efficiency |
| --- | --- | --- | --- | --- | --- |
|  | Percent of Monomer | Yield, Percent | Monomer Conversion, Percent |  |  |
| $K_2S_2O_8$ | 1.0 | 93.5 | 90 | 118 | 66 |
| $(NH_4)_2S_2O_8$ | 1.0 | 95 | 92.5 | 140 | 75 |
| Di-t-butyl peroxide | 1.0 | 83.5 | 75 | 130 | 87 |
| $H_2O_2$ | 2.0 | 93.5 | 90 | 164 | 90 |
| Azo-diisobutyronitrile | 1.0 | 92 | 88 | 142 | 81 |

These products were each molded in a two-piece cavity mold. The di-t-butyl peroxide and $-(NH_4)_2S_2O_8-$ initiated copolymers produced clear moldings while the other three moldings were opaque. All of the moldings were water, benzene, alcohol and acetone resistant.

Example 3

The process of Example 2 was followed in order to study the effect of initiator concentration on the styrene graft polymerizate. The results are summarized in Table II.

TABLE II

| Initiator Type | Percent of Monomer | M/P | Yield, Percent | Monomer Conversion, Percent | Grafting Level | Grafting Efficiency |
| --- | --- | --- | --- | --- | --- | --- |
| $K_2S_2O_8$ | .3 | 4/1 | 90 | 87.5 | 210 | 60 |
| $K_2S_2O_8$ | 1.0 | 4/1 | 94 | 92.5 | 275 | 74 |
| $K_2S_2O_8$ | 2.5 | 4/1 | 96 | 95 | 315 | 83 |
| $K_2S_2O_8$* | 2.5 | 4/1 | 98 | 97.5 | 320 | 82 |
| $K_2S_2O_8$ | .3 | 2/1 | 93.5 | 90 | 87 | 48 |
| $K_2S_2O_8$ | 1.0 | 2/1 | 93.5 | 90 | 118 | 66 |
| $K_2S_2O_8$* | 1.0 | 2/1 | 95.0 | 92.5 | 134 | 72 |
| $K_2S_2O_8$ | 2.0 | 2/1 | 97 | 95 | 116 | 62 |
| $H_2O_2$ | .5 | 2/1 | 88.5 | 82.5 | 118 | 71 |
| $H_2O_2$ | 2.0 | 2/1 | 93.5 | 91 | 164 | 90 |

*pH 8.0 instead of 6.5.

All of the above products were insoluble in water and benzene.

Example 4

The process of Example 2 was followed in order to study the effect of the ratio of styrene/protein. One percent $K_2S_2O_8$ based on the weight of the styrene was used as the initiator.

TABLE III

| M/P | Yield, Percent | Monomer Conversion, Percent | Grafting Level | Grafting Efficiency |
| --- | --- | --- | --- | --- |
| 4/1 | 94 | 92.5 | 275 | 74 |
| 2/1 | 94.5 | 91 | 115 | 64 |
| 1/1 | 95 | 90 | 67 | 74 |

Example 5

Eighty grams of soybean alpha protein was dissolved in 720 ml. of 0.4% by weight aqueous NaOH. The pH was lowered to 6.5 with 85% $H_3PO_4$. One hundred grams of the above solution and 20 grams of methyl methacrylate were charged into a seven-ounce pop bottle, which was purged with nitrogen. Initiator was added and the bottle was capped. After rotating the bottle in a water bath at 50° C. for 18 hours, the polymerizate was salted out by saturating the polymerization mixture with NaCl, filtered, washed and dried. The grafting level was determined by extracting each sample with 200 ml. acetone, and the results are tabulated in Table IV.

TABLE IV

| Initiator Type | Percent of Monomer | TNNPX | Percent Yield | Monomer Conversion, Percent | Grafting Level | Grafting Efficiency |
|---|---|---|---|---|---|---|
| $K_2S_2O_8$ | 1.0 | 0 | 93.5 | 90 | 140 | 77.5 |
| $(NH_4)_2S_2O_8$ | 1.0 | 0 | 93.5 | 90 | 144 | 80 |
| $(NH_4)_2S_2O_8$ | 1.0 | 1 g | 95 | 92.5 | 123 | 66 |
| $H_2O_2$ | 1.0 | 0 | 93.5 | 90 | 167 | 98 |
| $H_2O_2$ | 2.0 | 1 g | 93 | 90 | 135 | 75 |
| Azo-diisobutyronitrile | 1.0 | 0 | 73 | 60 | 87 | 72.5 |

TNNPX stands for Tergitol Nonionic NPX, which is nonylphenoxy polyethyleneglycol ether. The surfactant was added to the reaction vessel just prior to the addition of initiator.

All of the above, except the azo-diisobutyronitrile-catalyzed polymer, formed clear moldings, which were insoluble in water and benzene.

*Example 6*

Eighty grams of soybean alpha protein was dissolved in 720 ml. of aqueous 0.4% by weight NaOH. The pH was 10.4. One hundred grams of this solution and 20 grams of vinyl acetate were polymerized by the technique of Example 2, using as catalyst two grams $K_2S_2O_8$ and one gram $NaHSO_3$. There was a 100% yield and also 100% monomer conversion. A moldable graft copolymer was isolated by acetone extraction of monomer and homopolymer, and it had a grafting level of 120 with a grafting efficiency of 60.

*Example 7*

Ten grams of alpha protein and 20 grams vinyl acetate were charged into a 250 ml. 3-neck flask equipped with stirrer, Dry Ice condenser and nitrogen inlet and containing 90 ml. of 0.4% NaOH (pH of 10.4). An exothermic reaction took place on the addition of two grams $K_2S_2O_8$ and one gram $Na_2S_2O_4$, and, after stirring for five hours, a water-insoluble, acetone-insoluble graft copolymer (grafting level of 105) was isolated by acetone extraction.

*Example 8*

Ten grams of alpha protein and 20 grams of ethyl acrylate were charged into a seven-ounce pop bottle containing 90 ml. of 0.4% aqueous NaOH (pH of 10.4). This composition was polymerized by the technique of Example 2 using as catalyst 0.5 gram $K_2S_2O_8$ and 0.5 gram $Na_2S_2O_4$. The yield was 81%; monomer conversion was 70%; acetone-extracted grafting level was 65 and the grafting efficiency was 46. Essentially the same results were obtained at an initial pH of 8.

*Example 9*

Eight grams of pulverized iodine was added to a solution of 80 grams alpha protein in 720 ml. 0.4% aqueous NaOH. The initial pH was 8 but dropped to 6 after stirring at 50° C. for 2½ hours. Fifty grams of this iodated-protein solution, 10 grams of vinyl acetate, 0.3 gram of Tergitol Nonionic NPX (nonionic surface active agent) and one gram $Na_2S_2O_4$ were charged into a seven-ounce pop bottle. After purging with nitrogen, the bottle was shaken for 18 hours while being maintained at 50° C. The yield was 53%; monomer conversion was 30% and the acetone-extracted grafting level was 55.

*Example 10*

Fifty grams of the iodated-protein of Example 9, 10 grams of butyl acrylate, 0.3 gram Tergitol Nonionic NPX, 0.1 g. $K_2S_2O_8$ and 0.1 g. $NaHSO_3$ were reacted under the same conditions as Example 9. The yield was 90%; monomer conversion was 85% and acetone-extracted grafting level was 50.

*Example 11*

Three grams of pulverized iodine was dissolved in a solution of 30 grams of alpha protein in 270 ml. ammonia water at pH 8. The reactants were heated at 50° C. for one hour. One hundred grams of this solution, 10 grams of styrene, 0.5 gram of t-dodecyl mercaptan and one gram of $Na_2S_2O_4$ were charged into a seven-ounce pop bottle. After being purged with nitrogen, the bottle was shaken for 20 hours at 50° C. The yield was 91% while the benzene-extracted grafting level was 78. A grafting level of 90 resulted from using 100 grams of iodated protein of Example 9 and 0.5 gram carbon tetrachloride in place of the dodecyl mercaptan. Both products formed water-resistant films.

*Example 12*

One hundred grams iodated protein of Example 9, ten grams methyl methacrylate and one gram $Na_2S_2O_4$ were reacted under the same conditions as Example 9. The yield was 91.5%; monomer conversion was 83% and the acetone-extracted grafting level was 45. The product formed an opaque film on casting.

*Example 13*

Fifty grams alpha protein, 5 ml. $NH_4OH$ (conc.) and 445 ml. 1% bromine water were charged into a flask. The pH was raised to 9.5 with $NH_4OH$ and heated at 50° C. for one hour during which the pH decreased. The pH was again adjusted to 9.5 with $NH_4OH$, and the flask was purged with nitrogen and then heated for 18 hours at 50° C. One hundred two grams of the protein solution, 20 grams styrene and 2 grams $Na_2S_2O_4$ were charged into a seven-ounce pop bottle. After being purged with nitrogen, the bottle was shaken for 18 hours at 50° C. The yield was 97.5%; monomer conversion was 95%; the benzene-extracted grafting level was 68 while the grafting efficiency was 36%. This method repeated without $Na_2S_2O_4$ produced essentially the same results. Both products formed water-resistant films.

Although Examples 9 through 13 deal with the preparation of certain specific graft copolymers of this invention, the same techniques can be used to prepare graft copolymers of halogenated proteins with any ethylenically unsaturated monomer such as acrylamide, acrylic acid and substituted styrenes. Further, these same techniques can be used where the grafting level desired is as low as one. In these circumstances the ratio of monomer to protein can vary from 95%:5% to 5%:95%.

*Example 14*

Forty grams of alpha protein in 360 ml. of 0.4% NaOH was coupled with two grams of benzene diazo-sulfonate. With its pH lowered to 7.9 with 85% $H_3PO_4$, 100 grams of the solution with 20 grams of ethyl acrylate and one gram $Na_2S_2O_4$ was charged into a seven-ounce pop bottle. The bottle was purged with nitrogen and shaken for 18 hours at 50° C. The yield was 73%; the acetone-extracted grafting level was 100 and the efficiency was 62%.

Vinyl acetate, stylrene, acrylic acid and acrylamide have been reacted with diazo-coupled protein by the same technique.

As in the case of the halogenated proteins, the diazo-coupled proteins can be used to prepare graft copolymers of any mono-ethylenically unsaturated monomer where the grafting level can range from below 1 to 300 or more, using a monomer to protein ratio of from 95%:5% to 5%:95%. The diazo-coupled proteins can be prepared by coupling any diazonium compound or diazo-sulfonate with the protein under alkaline conditions by conventional methods. In addition to the benzene diazo-sulfonate of this example, the diazonium halides of p-phenylene diamines are especially efficacious. Representative of same are the diazonium halides of N,H-diethyl p-phenylene diamine and N-morpholinophenylene diamine.

*Example 15*

Ten grams of alpha protein, 90 ml. 2% NaOH, 1 gram of $K_2S_2O_8$ and 1 gram of $Na_2S_2O_4$ were heated in a seven-ounce pop bottle for 40 hours at 50° C. to oxidize the protein. Twenty grams of butyl acrylate and one gram $Na_2S_2O_4$ were charged into the bottle. After purging with nitrogen and heating at 50° C. for 18 hours, there was produced an acetone-extracted grafting level of 75. When no $Na_2S_2O_4$ was charged into the bottle with the butyl acrylate, no graft polymer resulted.

As in the case of the halogenated protein and diazo-coupled protein, the oxidized proteins, which have been treated with from about 5% to about 40% by weight peroxide, can be used to prepare graft copolymer with ethylenically unsaturated monomers, where the grafting level can range from below 1 to 300 or more using a monomer to protein ratio of from 95%:5% to 5%:95%.

Since many embodiments of this invention may be made and since many changes may be made in the embodiments described, the foregoing is to be interpreted as illustrative only, and my invention is defined by the claims appended hereafter.

I claim:

1. The method of producing a chemically modified protein which comprises reacting an ethylenically unsaturated monomer with a halogenated protein to produce a graft copolymer at a temperature of from about 20° C. to about 100° C.

2. A method of producing a chemically modified protein which comprises reacting an ethylenically unsaturated monomer with a halogenated protein to produce a graft copolymer at a temperature of from about 20° C. to about 100° C. in the presence of a catalytic amount of a reducing agent.

3. The method of claim 2 where the ethylenically unsaturated monomer is styrene.

4. The method of producing a chemically modified protein which comprises reacting an ethylenically unsaturated monomer with a halogenated protein selected from the group consisting of a brominated protein and a chlorinated protein to produce a graft copolymer at a temperature of from about 20° C. to about 100° C. in the absence of a catalyst.

5. The method of producing a chemically modified protein product which comprises reacting an ethylenically unsaturated monomer with a modified protein selected from the group consisting of a halogenated protein and a diazo-coupled protein to produce a protein graft copolymer at a temperature of from about 20° C. to about 100° C. in the presence of a catalytic amount of a catalyst consisting of a reducing agent.

6. The method of producing a chemically modified protein which comprises reacting an ethylenically unsaturated monomer with a diazo-coupled protein to produce a graft copolymer at a temperature of from about 20° C. to about 100° C. in the presence of a catalytic amount of a reducing agent.

7. The method of claim 6 where the ethylenically unsaturated monomer is ethyl acrylate.

References Cited by the Examiner

UNITED STATES PATENTS

| | | | |
|---|---|---|---|
| 2,137,393 | 11/1938 | Dorough et al. | 260—93.5 |
| 2,383,055 | 3/1945 | Fryling | 260—84.3 |
| 2,822,339 | 2/1958 | Hagemeyer et al. | 260—8 |
| 2,831,767 | 4/1958 | Dann et al. | 260—8 |
| 2,837,496 | 6/1958 | Vandenberg | 260—45.5 |

FOREIGN PATENTS

| | | |
|---|---|---|
| 733,093 | 6/1955 | Great Britain. |
| 807,891 | 1/1959 | Great Britain. |

WILLIAM H. SHORT, *Primary Examiner.*

LEON J. BERCOVITZ, M. STERMAN, E. M. WOODBERRY, J. ZIEGLER, *Assistant Examiners.*